US009218717B2

(12) United States Patent
Indrakumar

(10) Patent No.: US 9,218,717 B2
(45) Date of Patent: Dec. 22, 2015

(54) METHOD OF GAMING, A GAMING SYSTEM AND A GAME CONTROLLER

(75) Inventor: Kuppam Y Indrakumar, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 649 days.

(21) Appl. No.: 12/644,817

(22) Filed: Dec. 22, 2009

(65) Prior Publication Data

US 2010/0160030 A1 Jun. 24, 2010

Related U.S. Application Data

(60) Provisional application No. 61/139,969, filed on Dec. 22, 2008.

(51) Int. Cl.
*A63F 13/00* (2014.01)
*G07F 17/32* (2006.01)

(52) U.S. Cl.
CPC ....... *G07F 17/3258* (2013.01); *A63F 2300/558* (2013.01)

(58) Field of Classification Search
CPC .................................................. G07F 17/3258
USPC ........................................................... 463/23
See application file for complete search history.

(56) References Cited

U.S. PATENT DOCUMENTS 4,448,420 A 5/1984 Escamilla-Kelly
4,640,513 A 2/1987 Montijo
5,342,049 A 8/1994 Wichinsky et al.
5,651,546 A 7/1997 Lawlor et al.
5,961,384 A 10/1999 Robinson
6,210,276 B1 4/2001 Mullins
6,884,168 B2 * 4/2005 Wood et al. .................... 463/23
7,055,821 B1 6/2006 Huang
7,179,166 B1 2/2007 Abbott
2002/0067000 A1 6/2002 Larson et al.
2002/0151353 A1 10/2002 Gauselmann
2003/0003980 A1 1/2003 Moody
2003/0027619 A1 2/2003 Nicastro
2003/0114218 A1 6/2003 McClintic
2003/0119576 A1 6/2003 McClintic et al.
2003/0119580 A1 6/2003 McClintic et al.
2003/0125107 A1 7/2003 Cannon
2003/0190946 A1 10/2003 Baerlocher
2004/0048644 A1 * 3/2004 Gerrard et al. .................. 463/16
2005/0026664 A1 2/2005 Bansemer et al.
2005/0096130 A1 5/2005 Mullins (Continued)

FOREIGN PATENT DOCUMENTS

BE 1013608 4/2002
CA 1156453 11/1983

(Continued)

*Primary Examiner* — Milap Shah
*Assistant Examiner* — Thomas H Henry
(74) *Attorney, Agent, or Firm* — McAndrews, Held & Malloy, Ltd.

(57) ABSTRACT

Aspects of the present invention provide a gaming method, system and game controller for a game of skill. The result of the game of skill is evaluated to determine whether any potential award value for the game of skill is lost based on the player's skill based result. Potential award value for the game of skill may be lost as a result of application of the player's skill based result. Any lost potential award value is applied to a prize pool.

39 Claims, 12 Drawing Sheets

(56) References Cited

U.S. PATENT DOCUMENTS

| | | | |
|---|---|---|---|
| 2005/0181853 | A1 | 8/2005 | Baerlocher |
| 2006/0121971 | A1 | 6/2006 | Slomiany et al. |
| 2006/0214376 | A1 | 9/2006 | Weller |
| 2006/0258434 | A1 | 11/2006 | Jaffe et al. |
| 2007/0218980 | A1 | 9/2007 | Pachnis et al. |
| 2008/0064459 | A1 | 3/2008 | Kelly |
| 2008/0108410 | A1 | 5/2008 | Baerlocher |
| 2008/0113781 | A1 | 5/2008 | Soltys et al. |

FOREIGN PATENT DOCUMENTS

| | | |
|---|---|---|
| CA | 2404569 | 3/2003 |
| DE | 3104317 | 9/1982 |
| EP | 1253563 | 10/2002 |
| GB | 2421624 | 6/2006 |
| GB | 2429320 | 2/2007 |
| JP | 6291012 | 10/1994 |
| JP | 7308425 | 11/1995 |
| JP | 8071208 | 3/1996 |
| JP | 10289734 | 10/1998 |
| JP | 11321604 | 11/1999 |
| JP | 2000005380 | 1/2000 |
| JP | 2000005424 | 1/2000 |
| JP | 2000061035 | 2/2000 |
| JP | 2000157739 | 6/2000 |
| JP | 2000334094 | 12/2000 |
| JP | 2000334097 | 12/2000 |
| JP | 2001009083 | 1/2001 |
| JP | 2001321539 | 11/2001 |
| JP | 2001321540 | 11/2001 |
| JP | 2001340519 | 12/2001 |
| JP | 2002165931 | 6/2002 |
| JP | 2002172201 | 6/2002 |
| JP | 2002306711 | 10/2002 |
| JP | 2002306747 | 10/2002 |
| JP | 2002325891 | 11/2002 |
| JP | 2003047692 | 2/2003 |
| JP | 2003159367 | 6/2003 |
| JP | 2003159373 | 6/2003 |
| JP | 2003159377 | 6/2003 |
| JP | 2003169897 | 6/2003 |
| JP | 2003284817 | 10/2003 |
| JP | 2003325756 | 11/2003 |
| JP | 2004008252 | 1/2004 |
| JP | 2004049397 | 2/2004 |
| JP | 2004049462 | 2/2004 |
| JP | 2004174018 | 6/2004 |
| JP | 2004222963 | 8/2004 |
| JP | 2004254843 | 9/2004 |
| JP | 2004321421 | 11/2004 |
| JP | 2004329444 | 11/2004 |
| JP | 2005065905 | 3/2005 |
| JP | 2005102801 | 4/2005 |
| JP | 2005102955 | 4/2005 |
| JP | 2005124648 | 5/2005 |
| JP | 2005137802 | 6/2005 |
| JP | 2005144039 | 6/2005 |
| JP | 2005160781 | 6/2005 |
| JP | 2005205089 | 8/2005 |
| JP | 2005218776 | 8/2005 |
| JP | 2005237810 | 9/2005 |
| JP | 2005237812 | 9/2005 |
| JP | 2005253859 | 9/2005 |
| JP | 2005253860 | 9/2005 |
| JP | 2006006706 | 1/2006 |
| JP | 2006026154 | 2/2006 |
| JP | 2006101899 | 4/2006 |
| JP | 2006122260 | 5/2006 |
| JP | 2006212398 | 8/2006 |
| JP | 2006263029 | 10/2006 |
| JP | 2007075205 | 3/2007 |
| JP | 2007075483 | 3/2007 |
| JP | 2007144226 | 6/2007 |
| JP | 2007175449 | 7/2007 |
| JP | 2007202716 | 8/2007 |
| JP | 2007260203 | 10/2007 |
| JP | 2007260204 | 10/2007 |
| JP | 2007282714 | 11/2007 |
| JP | 2007312851 | 12/2007 |
| JP | 2007313160 | 12/2007 |
| JP | 2008029679 | 2/2008 |
| WO | WO03088162 | 10/2003 |
| WO | WO 2004023410 | 3/2004 |
| WO | WO2006063054 | 6/2006 |
| WO | WO2006096795 | 9/2006 |
| WO | WO2007076514 | 7/2007 |

* cited by examiner

METHOD OF GAMING, A GAMING SYSTEM AND A GAME CONTROLLER

RELATED APPLICATIONS

This application claims priority to U.S. Provisional Patent Application No. 61/139,969 having a filing date of Dec. 22, 2008, which is incorporated herein by reference in its entirety

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of gaming, a gaming system and a game controller.

It is known to provide a gaming system including a game controller arranged to generate a random result and apply game rules to the result to determine a game outcome for which a player may be awarded a prize if a predetermined winning outcome occurs.

While such gaming systems provide users with enjoyment, a need exists for alternative gaming systems in order to maintain or increase player enjoyment.

BRIEF SUMMARY OF THE INVENTION

According to one aspect there is provided a method of gaming comprising the steps of:

obtaining a player skill based result from play of a game of skill having a potential award value;

evaluating whether any of the potential award value has been lost based on the skill based result; and allocating the lost potential award value to a prize pool.

An embodiment further comprises the step of determining an additional award value payable to a player in addition to any award value that has been won based on the skill based result based on a prize pool value.

Where all of the potential award value has been lost, the whole potential award value is allocated to the prize pool and no award is payable to the player for the player skill based result.

The additional award value of this embodiment is a portion of the prize pool.

Some embodiments have more than one prize pool.

In an embodiment having more than one prize pool, one prize pool may correspond to each possible winning outcome having an associated potential award value for the skill based game. Where a winning outcome is lost the award value associated with the lost winning outcome is allocated to the corresponding prize pool. An additional award value can be determined for each winning outcome based on a total prize pool value of the prize pool corresponding to the winning outcome.

In an embodiment the potential award value can be made known to the player prior to playing the game of skill to provide the skill based result.

In another embodiment the potential award value is revealed to the player during play of the game of skill.

In another embodiment the potential award value is revealed to the player after playing the game of skill.

In an embodiment the game of skill is based on a Tetris game.

According to another aspect there is provided a gaming system comprising:

a player interface for entering game play instructions by a player and including a display for displaying a game;

a game of skill controller adapted to execute play of a game of skill, having a potential reward value, in response to player instructions to produce a player skill based result;

an outcome evaluator adapted to evaluate whether any potential award value for the skill based game has been lost based on the skill based result;

a prize manager adapted to allocate the lost potential award value to a prize pool; and a display controller adapted to control display of the execution and result of the game of skill.

The prize manager can be further adapted to determine an additional award payable to a player in addition to any award value that has been won based on the player skill based result based on a total prize pool value.

Where all of the potential award value has been lost, the prize manager is further adapted to allocate the whole potential award value to the prize pool and pay no award to the player for the player skill based result.

According to another aspect there is provided a game controller comprising:

a game of skill controller adapted to execute play of a game of skill, having a potential award value, in response to player instructions to produce a player skill based result;

an outcome evaluator adapted to evaluate whether any potential award value for the skill based game has been lost based on the skill based result;

a prize manager adapted to allocate the lost potential award value to a prize pool.

The game controller can further comprise a display controller adapted to control display of the execution and result of the game of skill.

According to another aspect there is provided computer program code which when executed causes a computer to implement a computer controlled gaming method as described above.

According to another aspect there is provided a method of gaming comprising the steps of:

obtaining a player skill based result from play of a game of skill;

using the skill based result to select active display positions for a game outcome from a plurality of ones of display positions;

selecting symbols for display in at least the active display positions using a random process to provide a game outcome; and evaluating the game outcome based on the active display positions.

According to another aspect there is provided a gaming system comprising:

a player interface for entering game play instructions by a player and including a display for displaying game outcome and prize information to the player;

a game of skill controller adapted to execute play of a game of skill in response to player instructions to produce a player skill based result used to select active display positions for a game outcome from a plurality of ones of display positions;

a symbol selector adapted select symbols for display in at least the active display positions;

a display controller adapted to control display of the execution and result of the game of skill and display of the selected symbols as a game outcome, wherein the selected symbols are displayed in respective ones of the plurality of display positions; and an outcome evaluator adapted to evaluate the game outcome based on the active display positions.

In an embodiment the game of skill is based on a Tetris game. The selected symbols can be selected from a plurality of symbol sets representative of symbols on spinning reels, wherein the symbols are selected for display in the active display positions based on reel stop positions.

DETAILED DESCRIPTION OF THE INVENTION

Figure 1:
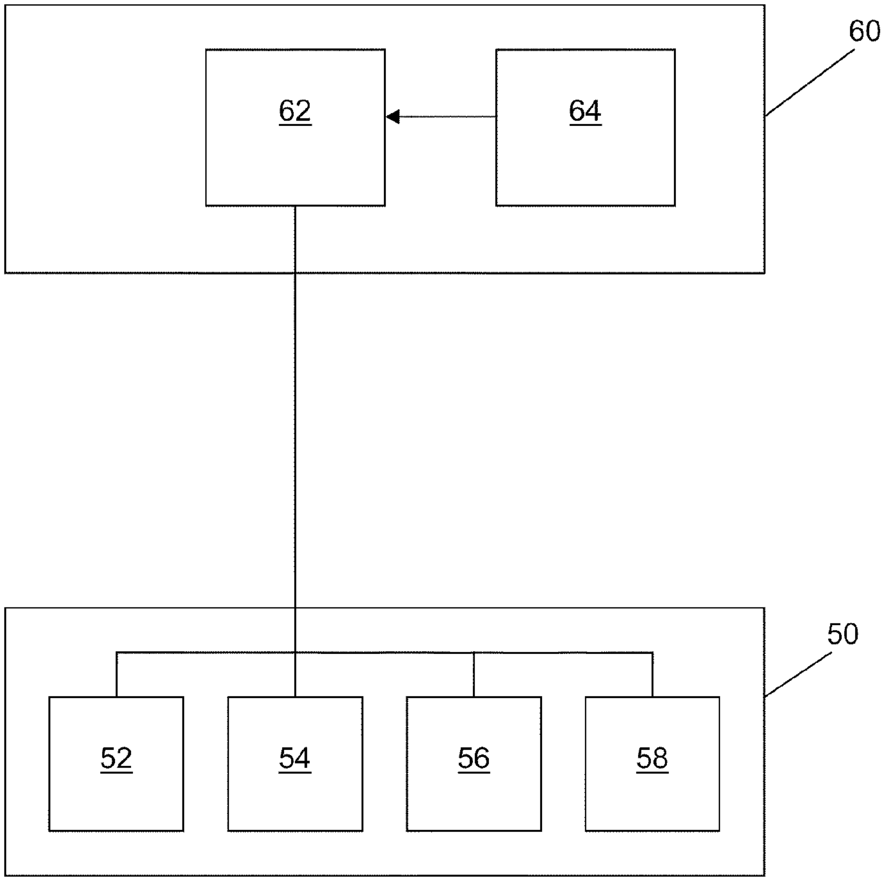
FIG. 1 is a block diagram of the core components of a gaming system.

Referring to the drawings, there is shown a gaming system having a game controller arranged to implement a game of skill. The outcome of the game of skill depends on the skill of the player. For example, a potential award value for the skill based game may be lost based on the skill based result of the player. Any lost potential award value is applied to a prize pool.

An additional award value payable to a player, in addition to any award value that has been won based on the skill based result, can be based on a total prize pool value. The additional award value of can be a portion of the prize pool.

Where all of the potential award value has been lost, the whole potential award value is allocated to the prize pool and no award is payable to the player for the player skill based result.

In some embodiments the result of the game of skill is applied to a first game outcome. The first game outcome is transformed, based on the outcome game of skill, into a second game outcome. The second game outcome may be the same or different from the first game outcome, depending on the skill of the player. Potentially winning outcomes for the first game outcome may be lost as a result of application of the skill based result. In some embodiments the first game outcome is generated as an outcome of a game of chance using a random process. Alternatively, the first game outcome may be generated using a non-random process or be predetermined.

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
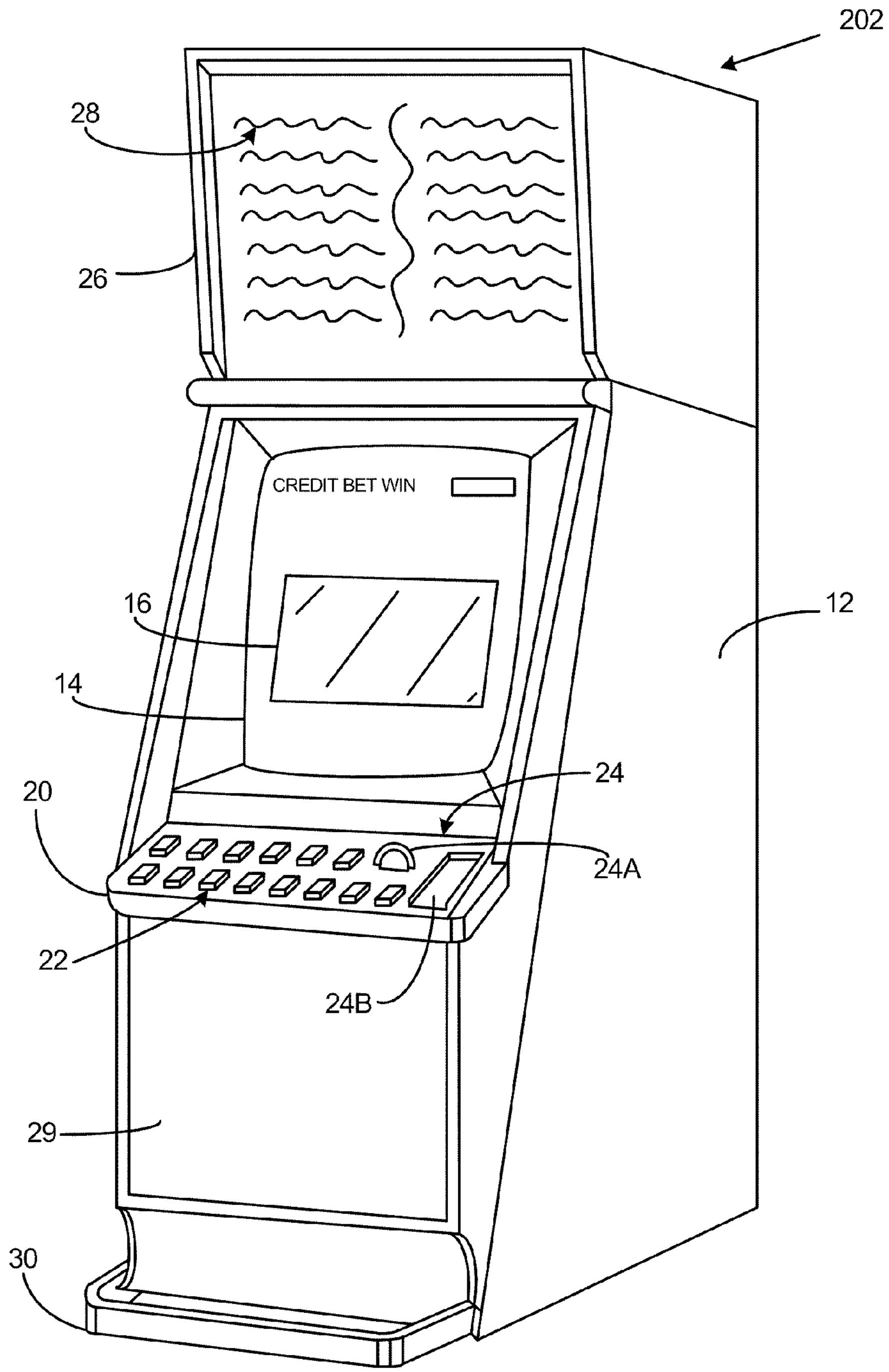
FIG. 2 is a perspective view of a stand alone gaming machine.

A gaming system in the form of a stand alone gaming machine 202 is illustrated in FIG. 2. The gaming machine 202 includes a console 12 having a display 14 on which are displayed representations of a game 16 that can be played by a player. A mid-trim 20 of the gaming machine 202 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
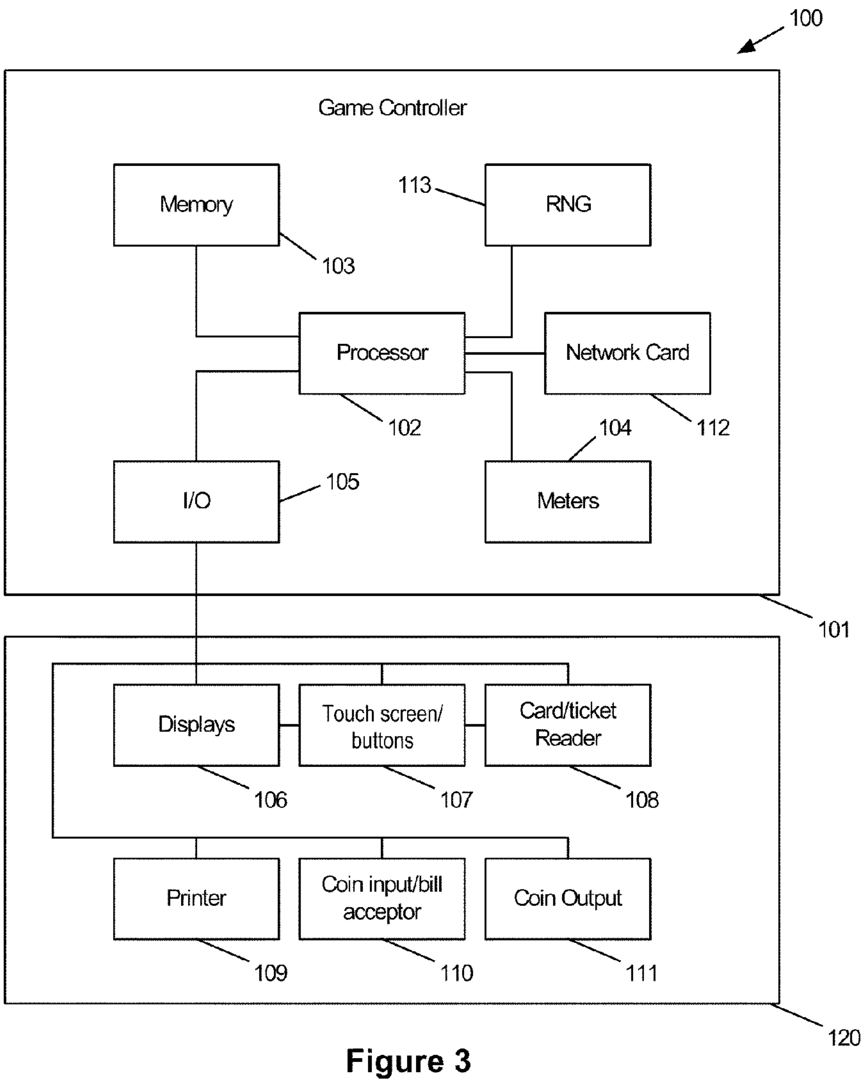
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107 (which provide a game play mechanism), speakers or audio output (not shown), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
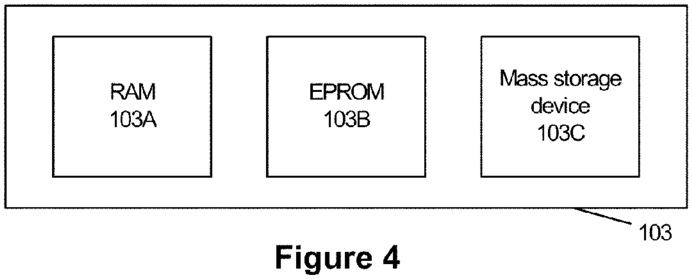
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
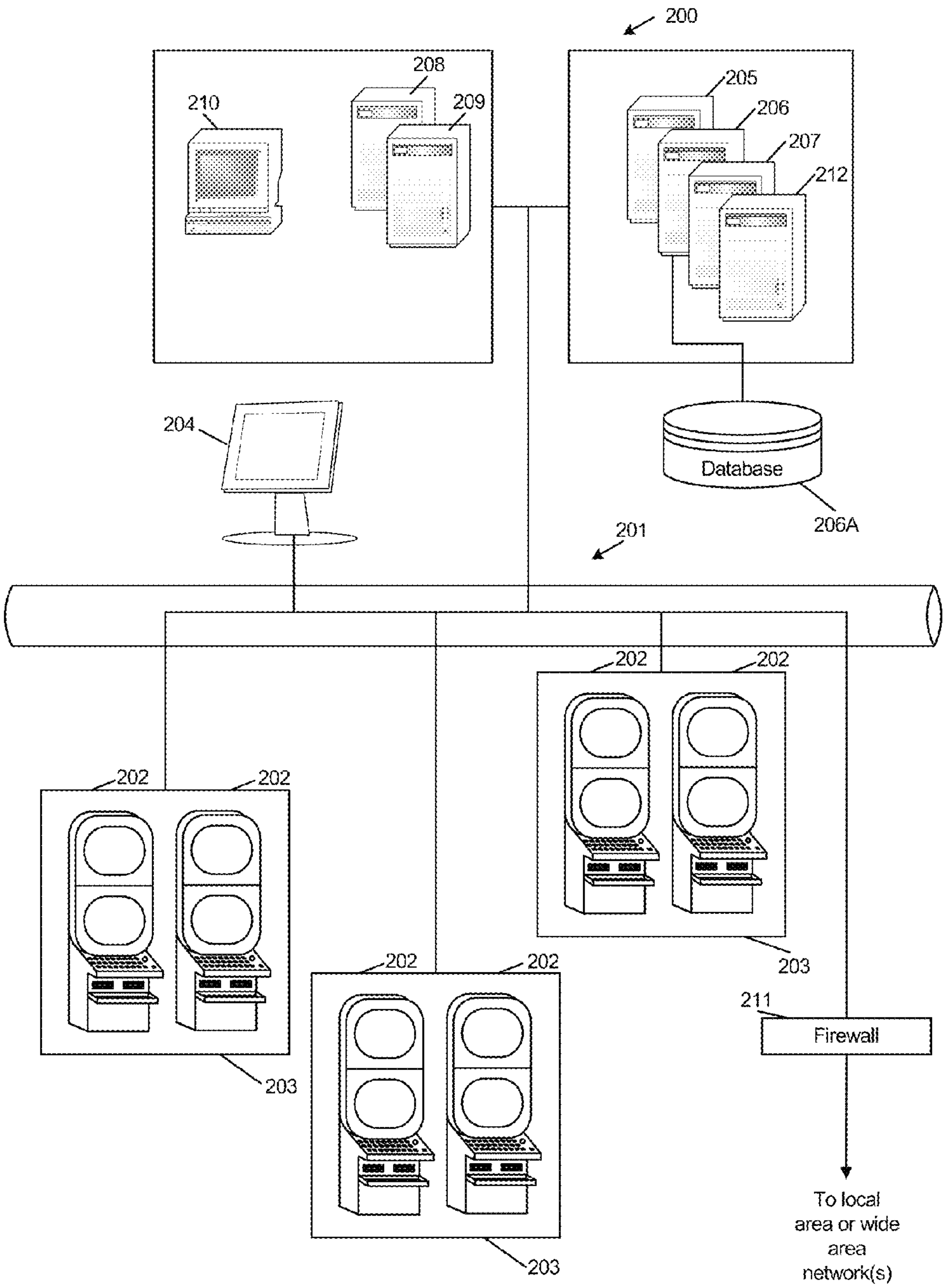
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 202,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Embodiments of the present invention implement a game of skill. The outcome of the game of skill depends on the skill of the player. For example, a game of skill may be a shooting game, a pinball game, a space invaders type game, a maze game, a memory game etc. The player has the potential to achieve one or more winning outcomes for the skill based game. Whether or not winning outcomes occur is based on the player's skill. One or more awards may be won or lost based on the skill based result of the player. In embodiments of the present invention, any award that would have been payable for a winning outcome that has been lost by the player is applied to a prize pool. For example, if in a space invaders type game one hundred credits is payable for each space station destroyed, and a player only destroys one space station, the amount that has been lost by the player is two hundred credits. Thus, one hundred credits for each space station that the player failed to destroy is applied to the prize pool.

An award payable to a player for any winning outcome can be based on a prize pool value. For example, a payout for the winning outcome of destroying one space station may be a percentage of the prize pool. Allocating awards for winning outcomes based on a prize pool prize to which award values for lost winning outcomes is allocated enables a return to player for the skill based game which complies with regulatory requirements.

Some embodiments of the present game combine a first game outcome and a game of skill to provide a second game outcome for which a player's win entitlement can then determined. Some embodiments combine a game of chance and a game of skill, wherein the first game outcome is generated as an outcome of a game of chance using a random process. Alternatively, the first game outcome may be generated using a non-random process or be predetermined. For example, the first game outcome may be generated using a pattern, mathematical model, or be selected from a set of previously generated first outcomes.

Figure 6:
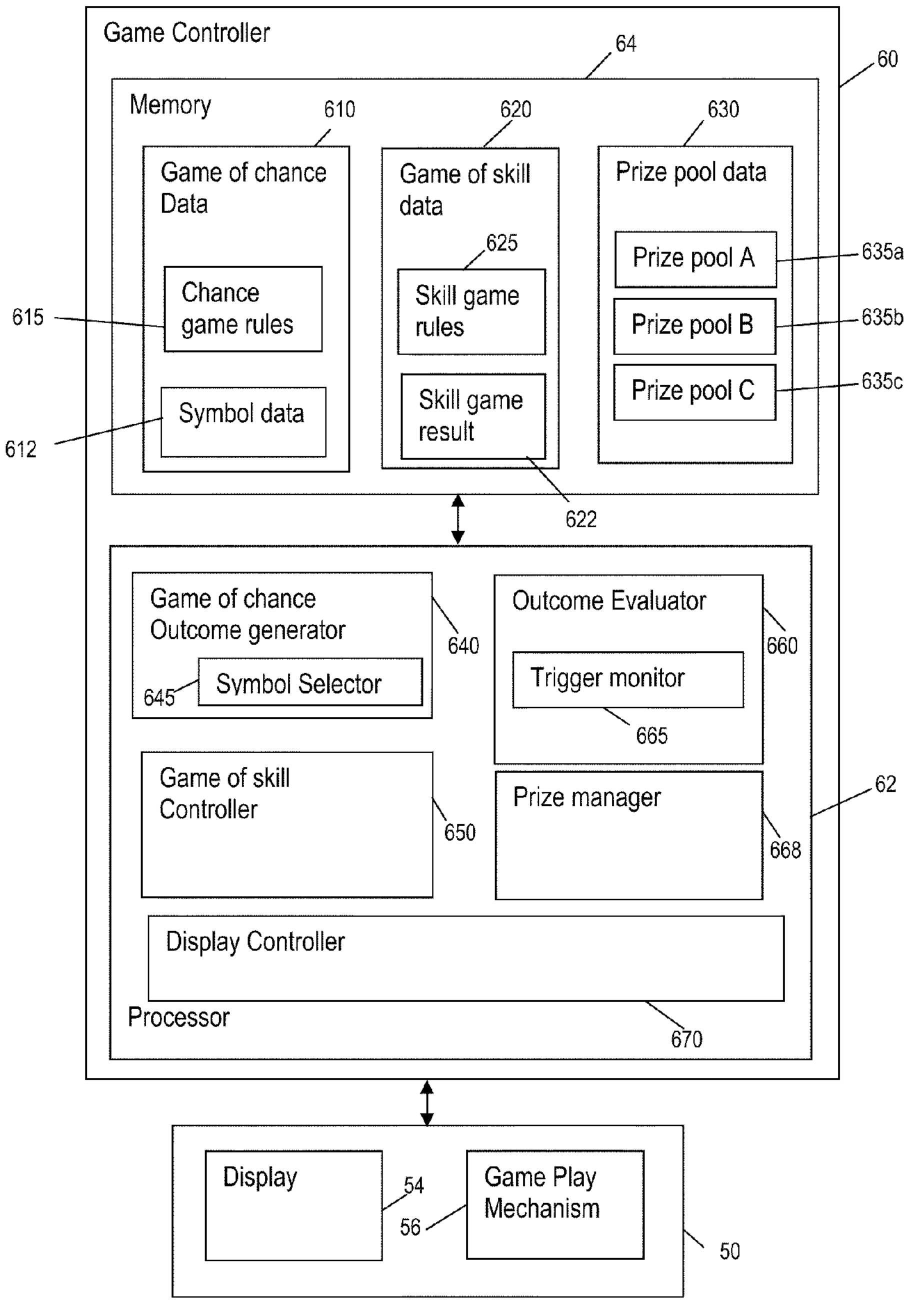
FIG. 6 is a further block diagram of a gaming system.

An example of a system for implementing an embodiment of the game having a spinning reel game as the game of chance is illustrated in FIG. 6. (Where possible the same numbering as FIG. 1 is used.) The gaming system comprises a gaming controller 60 and a player interface 50. The gaming controller 60 includes a processor 62 and memory 64. Functions implemented in the game controller include a game of chance outcome generator 640 having a symbol selector 645, a game of skill controller 650, an outcome evaluator 660, a prize manager 668 and a display controller 670. The memory 64 stores game of chance data 610, game of skill data 620 and prize pool data 630.

The game of chance data 610 can comprise game rules 615 for the game of chance and data applicable for the game of chance, such as symbol data 612 for a spinning reel game. For example the game of chance rules 615 may be in the form of software instructions which are executable by the processor to implement the game of chance in conjunction with the game of chance data 610 and in response to player input. Alternatively, the game of chance may be implemented at least in part in hardware wherein the game of chance rules are hard wired or hard coded in hardware such as application specific integrated circuits (ASIC), or coded in programmable hardware such as programmable logic controllers or field programmable gate arrays (FPGA). Alternatively the game com chance may be implemented using a combination of hardware, firmware and software.

The game of skill data can include game rules 625 or instructions for execution of the game of skill, the result 622 of a game of skill played by the player may also be stored in memory. The game of skill controller may be implemented in software executable by the game controller processor. Alternatively the game of skill may be implemented in hard wired, hard coded or programmable hardware. Alternatively the game of skill may be implemented using a combination of hardware, firmware and software.

The prize pool data can comprise the value of one or more prize pools 635*a-c* and may also include additional data such as win entitlement rules for each prize pool, alternatively win entitlement rules for each prize pool may be included in the chance game rules 615. The player interface includes a display 54 and game play mechanism 56.

The player inputs game play instructions using the game play mechanism 56. For example the player may select a number of pay lines and enter an amount to wager per pay line. A first game outcome for the game of chance is generated in response to the player's instructions. This first game of chance outcome may be generated before or after playing the game of skill, depending on the embodiment implemented. To generate the first outcome the symbol selector 645 selects symbols from symbol data 612. For example, in a spinning reel embodiment, the symbol data can comprise a set of available symbols for each of a plurality of groups. Each group may specify the configuration of one of a plurality of reels. The symbol selector may be in the form of a reel controller for selecting stop positions for each reel. To generate the game outcome the reel controller selects stop positions for each reel. The selected reel stop position determined the symbols selected from each group for display in the game outcome. If the game outcome is generated before play of the game of skill, the game outcome may be displayed to the player before play of the game or skill. Alternatively the game outcome may be revealed, at least in part, during the game of skill. Alternatively the game outcome may remain hidden or not be generated until after completion of the game of skill.

A game of skill is played by the player. The game of skill controller controls execution of the game based on the skill game rules 625 and instructions input by the player using the game play mechanism 56 to produce a player skill based result 622. The game play mechanism may use the same controls, such as buttons or touch screen, for receiving player inputs for both the game of chance and the game of skill. Alternatively an input mechanism different to that used for game of chance play may be provided for the game of skill. For example, the game of chance may be played using a touch screen, whereas a joystick and buttons are provided for play of the game of skill.

An example of a skill based game is a Tetris game, wherein the position of falling blocks of different shapes can be controlled by the player, by pressing buttons or other controls, to influence the orientation and lateral position of the block as they fall aiming to avoid gaps between the blocks when they come to rest. In the context of the present game, the object for the player is to fill the outcome display positions with the Tetris blocks leaving no gaps between the blocks. Gaps between the blocks cause symbols to be removed from the game of chance game outcome and therefore, potentially, lose an otherwise winning symbol combination.

The display controller 670 is provided with data defining the symbols to display for each group by the symbol selector 645 this data can also include display positions for each symbol or group of symbols. The display controller displays the selected symbol set in accordance with this data on the display 54. Depending on the embodiment implemented the game controller may display the initial outcome before the player plays the game of skill or display a blank outcome, so the initial outcome is hidden from the player until a later time during game play. For example, the sections of the initial outcome may be displayed during play of the game of skill or only after play of the game of skill. For example, in an embodiment the Tetris blocks may reveal symbols at symbol positions behind the blocks as they fall, giving an x-ray effect which may provide additional entertainment and add a memory skill element to the skill game. Alternatively symbols may be made visible in symbol positions occupied by a block once the block comes to rest. Alternatively the game of skill may be played before the outcome of the game of chance is generated. In a further embodiment the outcome for the game of chance may be generated during play of the game of skill. For example, in this embodiment reels may be shown spinning and stopping as the skill game is played.

The outcome evaluator 660 applies the result of the skill game to the first outcome of the game of chance to transform the first outcome into a second game outcome. For example, the skill based result from a Tetris game may have blocks in some or all display positions. The symbols in the second outcome will be the symbols for display positions having blocks. The symbols of display positions which correspond to gaps between the blocks will be excluded from the second outcome. Thus, the second outcome will comprise a subset of the symbols selected for the first outcome, with the subset selected based on the skill based result. It should be appreciated that for a skilled player the first and second outcomes may be identical. Data may also be provided to the display controller 670 by the outcome evaluator 660 for display of the second outcome.

Where the outcome evaluator 660 determines that one or more winning outcomes from the first outcome have been lost in the second game outcome from application of the skill based result, the prize manager 668 determines the difference in award values for the first and second outcomes and allocates the difference value to a prize pool stored in prize pool data 630. Thus, the award value for a potentially winning outcome which is lost when the skill based result is applied is added to the prize pool. Depending on the embodiment there may be a single prize pool or several prize pools 635*a-c*. For example, in an embodiment where more than one prize pool exists, each prize pool may be associated with one or more winning outcomes. If a player had the potential to win an outcome, from its occurrence, in the first game outcome generated for the game of chance, but does not, based on the result of the game of skill, then the award value associated with the outcome will be added to the prize pool associated with that outcome. The prize pools may be local to a gaming machine, such that only players of that particular machine contribute to the prize pool. Alternatively prize pools may be combined for a number of gaming machines within one gaming venue or even combined for several gaming venues, for example via a local or wide area network. In some embodiments a combination may be used. For example, one prize pool may be associated with the gaming machine, another prize pool may be combined with a group of gaming machines or the gaming venue and a further prize pool be combined with a sister gaming venue.

The outcome evaluator 660 determines whether any winning combinations exist in the second outcome. Data can be provided to the display controller 650 by the outcome evaluator 660, for example to cause highlighting of prize winning combinations of symbols on the display 54. The outcome evaluator 660 provides win data to the prize manager 668 to determine a win entitlement for a player based on the prize pool value. The manner by which a win entitlement is determined for a winning outcome may vary based on the embodiment. In the present embodiment the win entitlement comprises two components, a fixed award value associate with the winning outcome and a variable award value based on the prize pool value. For example, a fixed award amount associated with the winning outcome may be twenty credits and this value can be defined in the game rules. This amount also represents the amount which would have been added to the prize pool if this outcome had occurred in the first outcome generated for the game of chance but not in the second outcome due to the result of the game of skill. The variable component may be defined as a portion of the total prize pool value, for example ten percent. Thus, if the prize pool has a value of one thousand credits, then the variable component of the win entitlement is one hundred credits, making the total win entitlement for the player one hundred and twenty credits, by adding the fixed component. The amount remaining in the prize pool is adjusted, based on the amount paid out from the prize pool, to leave nine hundred credits in the prize pool. The variable component of a win entitlement will vary based on the value of the prize pool which is increased by players missing out potential winnings as a result of the skill based game and decreased based on amounts awarded to players for wining outcomes. At times the prize pool may achieve a zero value. For example, a percentage amount may be rounded up to the nearest whole credit, such that when a ten percent variable payout occurs for a prize pool having only five credits left, the payout will be one credit. Leaving only four credits in the pool, thus it is possible to achieve a zero credit value in the pool even where payouts are made on a percentage basis.

In the embodiment illustrated the prize pool data 630 includes three prize pools 635*a-c*. Prize pool A 635*a* may be associated with winning outcome combination A, prize pool B 635*b* with winning outcome combination B and prize pool C associated with winning outcome combination C. Say an initial game outcome generated for the game of chance includes winning outcomes combinations A, B and C. Where the second outcome, provided by applying the result of a game of skill to the first outcome only includes winning outcome combination B, the award value associated with combination A is added to the value of prize pool A 635*a* and the award value associated with combination C is added to the value of prize pool C 635*c* because the player has "lost" these combinations as a result of the game of skill. The player's win entitlement for winning combination B is determined based on the value of prize pool B 635*b*. Thus the player may contribute to one or more prize pools 635*a*, 635*c* and receive a win entitlement from another 635*b* in the same round.

Winnings paid out to gaming players must conform to given regulatory requirements, the conformity to regulatory requirements is based on mathematical models. Mathematical models in respect of games of chance can be developed to reliably operate with in the regulatory framework. However, for games of skill, as the outcome is largely dependent on the ability of the individual player. Whether or not a player will achieve a possible winning outcome is unpredictable and therefore it becomes difficult or impossible to reliably comply with regulatory requirements. In most cases where a game of skill is available to a player, the game of skill is played as a bonus game to avoid disrupting the mathematical model of the main game. Use of a prize pool, as disclosed herein in various embodiments, can overcome this problem. A player's win entitlement becomes based on the value of a prize pool which is built up using awards foregone by players due to the result of the skill game. Thus the total value payable to players remains in compliance with regulatory requirements.

Alternative mathematical formulae may be applied to determine the win entitlement. However, all embodiments are characterised by the win entitlement for the second outcome including some amount from the prize pool. For example, instead of having distinct fixed and variable components to the win entitlement, an embodiment may add the entire amount payable for winning combinations to the prize pool prior to determining a player's win entitlement, the players win entitlement for any winning combination may then simply be an amount proportional to the total prize pool value. In this embodiment a minimum win value may be set which is equal to an award value associated with the winning outcome. The prize pool can have a value of zero which represents the entire pool value has been paid out or this may be an initial value prior to any contributions being made to the prize pool. It will be understood by a skilled person that by contributing to the prize pool for outcomes a player had the potential to win, but didn't due to the application of the skill based results, and paying out for winning outcomes from the prize pool, the total amount paid out to players remains the same and therefore complies with regulatory requirements. It should be appreciated that variations on this payout method are envisaged and all possible variations contemplated within the scope of this gaming method and system.

The win entitlement for a player may also be based on the amount wagered for the game. For example, a player wagering five credits per win line may be entitled to a variable win component of five percent of the prize pool for a given winning outcome whereas a player wagering ten credits per win line may be entitled to variable win component of seven percent of the prize pool.

In some embodiments the game of skill is not played for every game round. For example, the game of skill may be played when a trigger condition is met. For example, a game of skill may be played only for game of chance outcomes where a winning outcome is possible. Alternatively, the game of skill may be played periodically such as every third round or triggered randomly. Thus, some winning game of chance outcomes may occur where the game of skill is not played. In such embodiments the outcome evaluator 660 includes a trigger monitor 665 adapted to determine when the eligibility criteria for the game of skill is met.

Figure 7A:
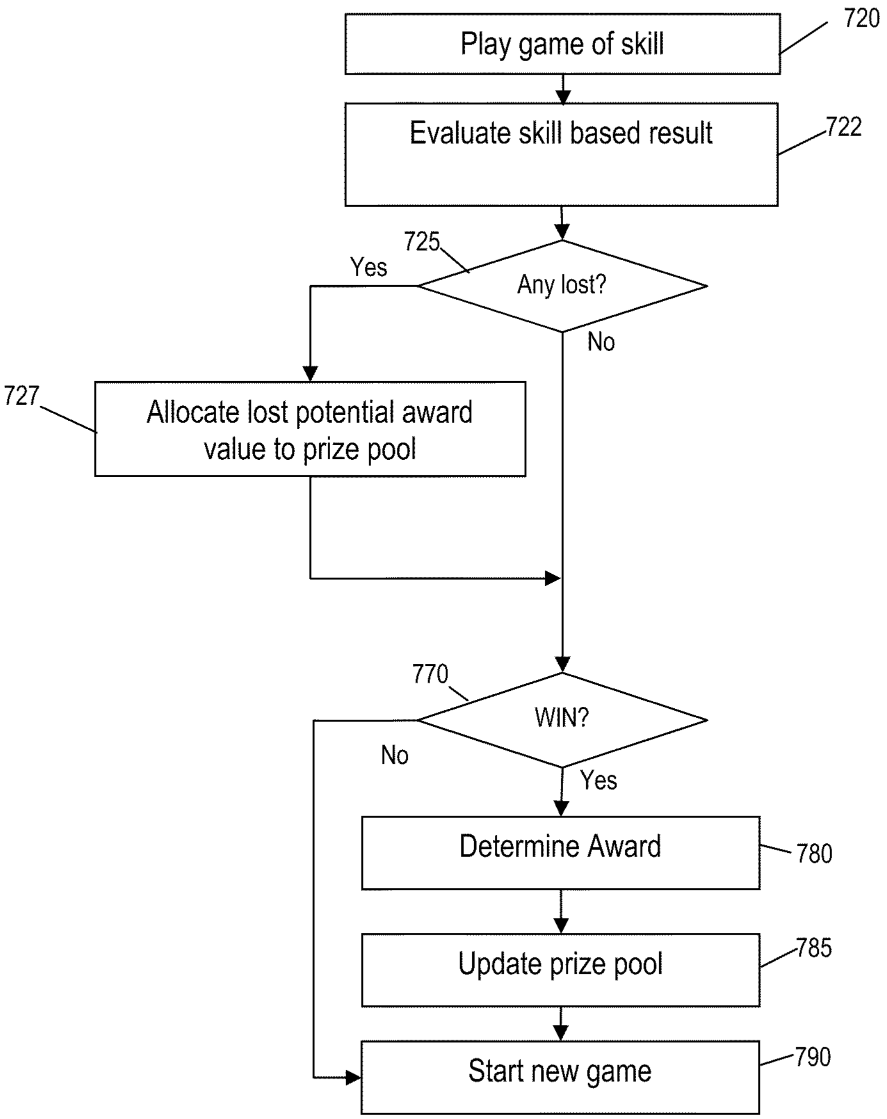
FIG. 7*a* is a flow chart of an embodiment.

An example of a process for playing a game of skill and handling the prize pool is illustrated in FIG. 7*a*. The player plays a game of skill 720. The outcome of the game of skill is evaluated 722 to determine whether any potential award value has been lost based on the player skill based result. For example, potential winning outcomes may not have been achieve and therefore the potential award value associated with such outcomes is "lost" by the player 725. The lost potential award value, that would have been payable for any lost outcomes, is allocated to a prize pool 727. The player may have won some of the potential award value based on the player skill based result. If the player has won any potential outcomes 770 an additional award playable to the player can be determined 780 based on the prize pool and awarded to the player. For example the award value won may be a fixed number of credits and the additional award value a percentage of the prize pool value. The prize pool is then updated 785 and a new game can be started. The percentage of the prize pool value may be selected based on regulated return to player requirements and skill level models to attempt to pay out at a rate that ensures the prize pool total value does not continuously increase. It should be appreciated that as a player's skill improves the player is likely to lose less and win more. The prize pool total can be added to from losing outcomes from a number of players. Thus, a skilled player may be able to win more than a standard payout for winning outcomes.

Some embodiments combine a game of chance and a game of skill. An advantage to an embodiment where the game of skill is played for each game of chance outcome is that the player has the entertainment of playing the game of skill each round and potentially improves their skill level, in turn increasing their winning potential.

Figure 7B:
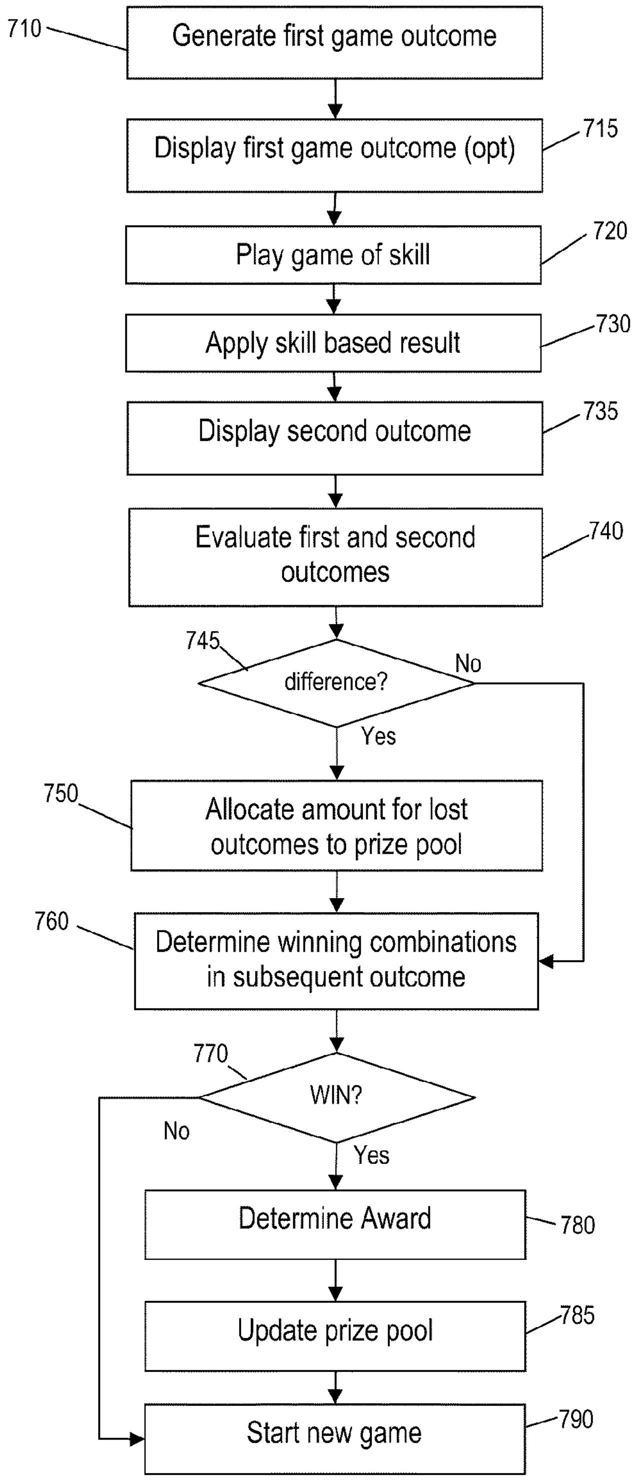
FIG. 7*b* is a flowchart of an alternative embodiment.

An example of a game play process is illustrated in FIG. 7*b*. In response to a player's instructions a first game outcome is generated 710. Optionally this first game outcome may be displayed to the player 715 before playing a game of skill 720. Alternatively the gem of skill may be played first, before generating the first game outcome. Alternatively, where the first game outcome is generated using a game of chance, the game of skill and game of chance may occur concurrently. The result of the game of skill is applied to the first game outcome 730 to provide a second game outcome which is then displayed 735. The first and second game outcomes are then evaluated to determine whether any winning outcomes of the first game outcome have been lost in the second game outcome from application of the skill based result 740. If there is a difference 745, then award value for the lost outcomes is added to the prize pool 750. Where more than one prize pool is used then the value for each prize pool can be determined separately, for example based on winning symbol combinations associated with each prize pool. If there is no difference between any winning outcomes then step 750 is skipped.

The second game outcome is then evaluated to determine whether any winning outcomes occur 760. If no winning outcome occurs a new game can be started 790. If a winning outcome occurs 770, then the win entitlement for the winning outcome or outcomes is determined based on the prize pool value 780 and awarded to the player, for example by updating the player's win meter with the appropriate amount. The prize pool value is then updated 785 to reflect the amount allocated to the player, this concludes the game round and a new game round can be started 790.

In some embodiments, at the conclusion of the game round the first game outcome may be displayed to the player. This may reveal any winning outcomes the player had the potential to win. A different highlighting scheme may be used to distinguish between winning outcomes occurring and not occurring in the subsequent outcome. For example, a win line may flash green for a winning combination which occurred in the second game outcome and a win line flash red for a winning combination which was present in the first outcome but "lost" in the subsequent outcome.

An alternative embodiment obtains a player skill based result from play of a game of skill and uses the skill based result to determine active display positions for a game outcome. A symbol selector selects symbols for display in at least the active display positions using a random process to provide a game outcome. The game outcome is evaluated based on the active display positions. For example, a Tetris style game of skill can be used to determine the active display positions for a spinning reel game. Symbols are selected from a plurality of symbol sets representative of symbols on spinning reels based on reel stop positions for display in the active display positions. The reel stop positions may be selected using a random process if the first game outcome is generated as a game of chance. Alternatively predetermined reel stop positions may be used to select the symbols. The game outcome is then evaluated based on the symbols displayed in the active display positions. In this embodiment, symbols may also be selected for inactive display positions and displayed to show any potentially winning combinations which may have occurred if all display positions were active. However, only the symbols of the active display positions are used to evaluate the outcome.

The examples discussed above combine a spinning reel game for the game of chance and a Tetris style game of skill. Alternatively a pair matching memory type game, jigsaw puzzle, target shooting or maze game may be used for the game of skill. It should be appreciated that embodiments could be applied for any combination of first game outcomes, games of chance and games of skill. For example, a card dealing chance game could be combined with a ping pong game. Passage of a ping pong ball over the back of a dealt card could cause the card to turn over, revealed the values or symbols on the set of dealt cards can then be evaluated for winning combinations. Infinite variations are envisaged within the scope of the present application.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

It will be understood to persons skilled in the art of the invention that many modifications may be made without departing from the spirit and scope of the invention, in particular it will be apparent that certain features of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Example 1

In the following non limiting example a player is playing a game combining a 5×5 spinning reel game of chance and a Tetris style game of skill. The player pays a ten credit bet to play the game.

Game rules define win entitlements for winning symbol combinations in a subsequent outcome comprise a fixed component of the award value associated with the winning combination and a variable component of ten percent of the prize pool value.

The starting prize pool value is three thousand credits.

Figure 8A:
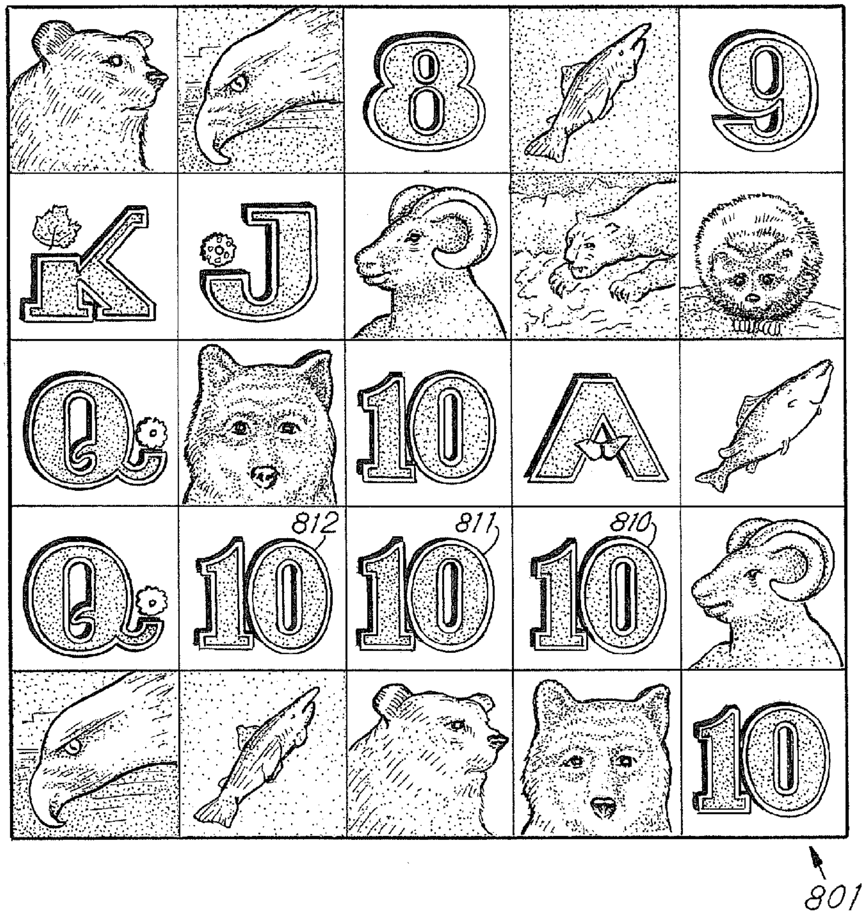
FIGS. 8*a-e* illustrate an example of displayed game play.

An initial game outcome generated for the game of chance is illustrated in FIG. 8*a*. The symbols on the reels 801 include a winning symbol combination of three tens 810-812 which is associated with an award value of ten credits.

Figure 8B:
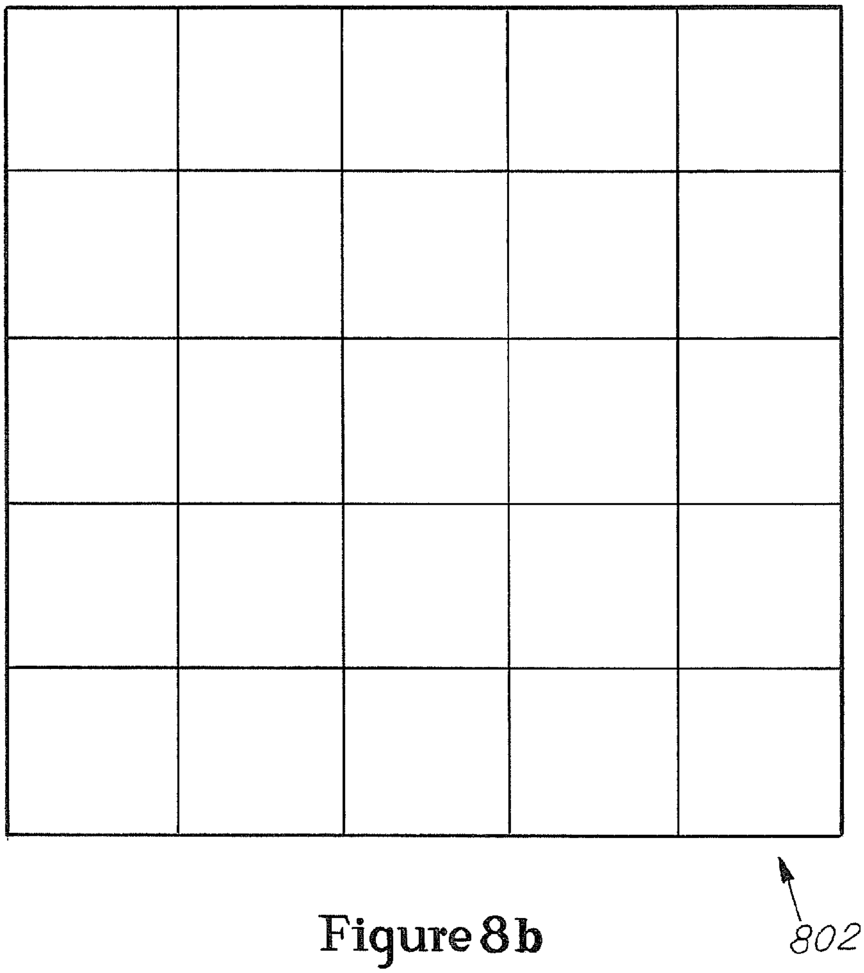

In the embodiment of this example, then initial outcome is not shown to the player. Rather the player initially sees a blank outcome display area 802 as illustrated in FIG. 8*b*.

Figure 8C:
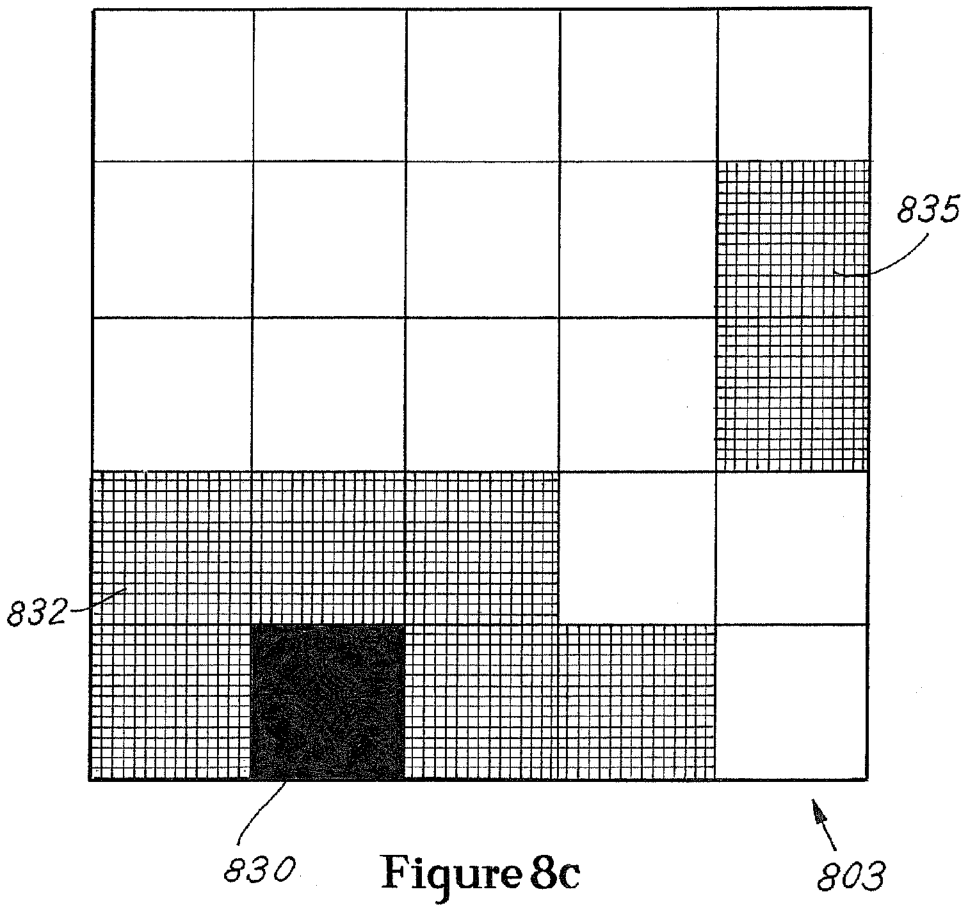
Figure 8D:
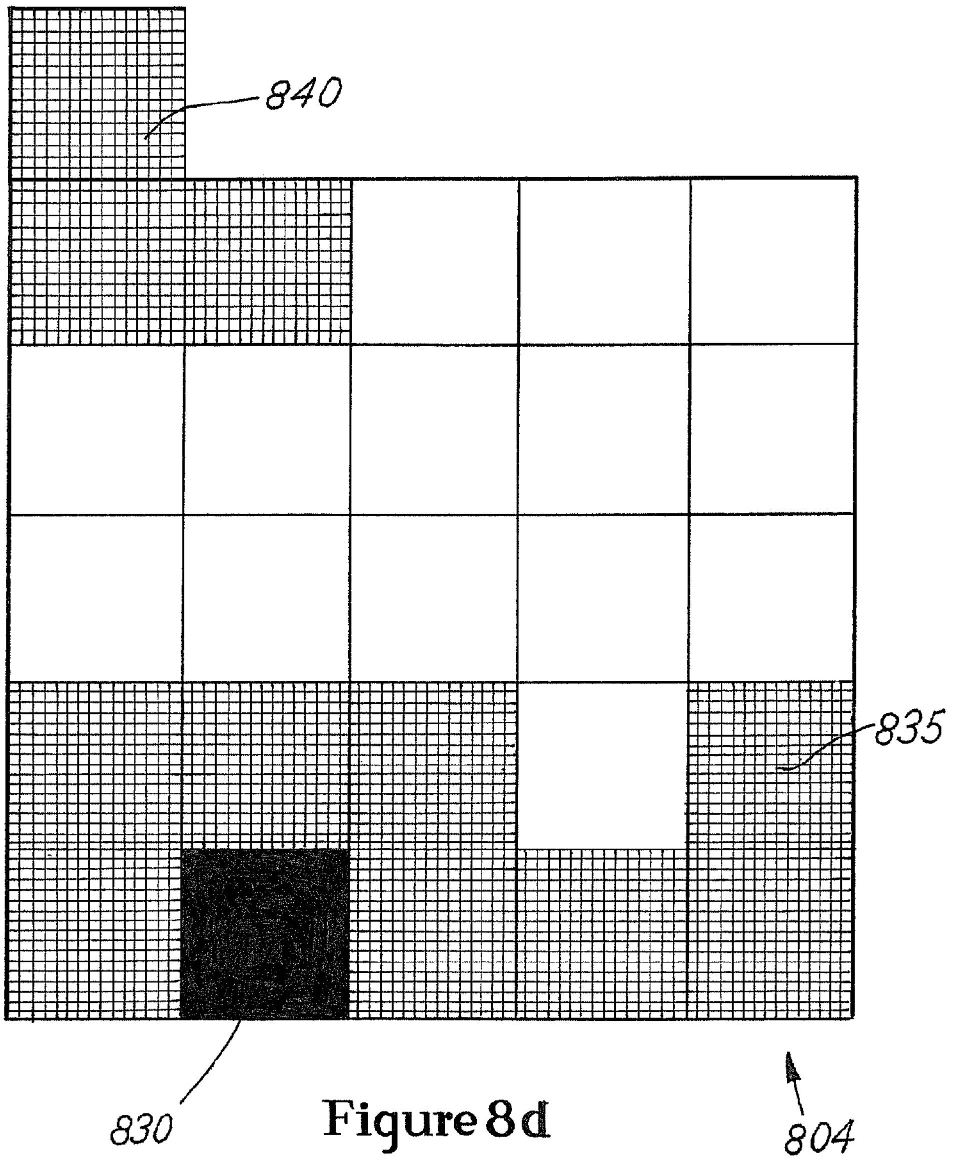

FIGS. 8*c* and 8*d* illustrate two stages of the play of the skill game. In FIG. 8*c* shows the player already having one gap 830 in the fallen blocks 832 and a further block 835 in the process of falling. The gap 830 corresponds to one symbol display position in the display area 803. FIG. 8*d* shows the block 835 fallen into place and a further block 840 commencing its fall into the display area 804.

Figure 8E:
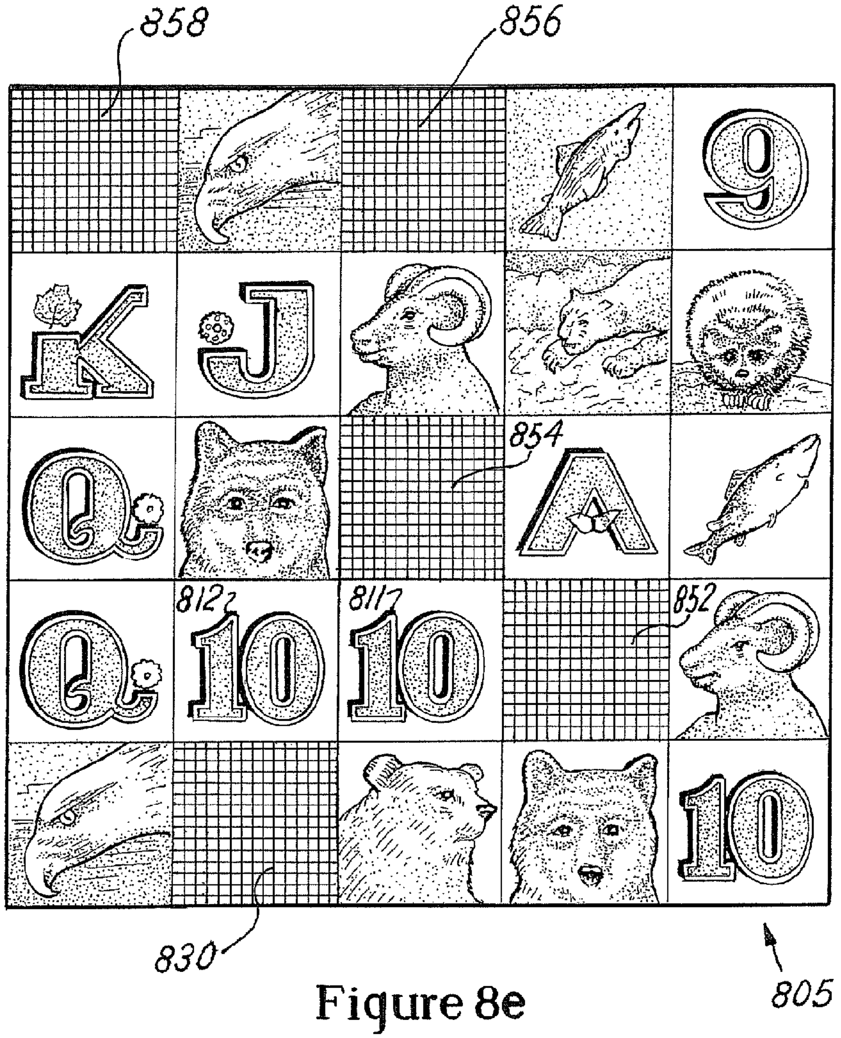

FIG. 8*e* shows the subsequent outcome displayed on completion of the game of skill. The symbols on the reels 805 are displayed only where Tetris blocks have landed. In the positions where there were gaps 830, 852, 854, 856, 858 the symbols are blacked out and not shown. In this outcome only two of the tens 811, 812 appear with the third ten 810 which would make up the winning symbol combination obscured by a gap 852 and thus, not included in the subsequent outcome. As a result there are no winning combinations in the subsequent game outcome and no award to the player. The ten credits which the player had the potential to win for this game round are added to the prize pool making the prize pool value three thousand and ten credits.

If the player had achieved a clear result for the Tetris game, having no gaps, then the subsequent game outcome would have been identical to the initial game outcome as illustrated in FIG. 8*a*. In this case the player would have a win entitlement calculated based on the prize pool value for the three tens 810-812 winning symbol combination. The win entitlement would comprise a fixed component of ten credits, being the credit value associated with the three tens symbol combination and a variable component of three hundred credits, being ten percent of the prize pool. Thus, the total win entitlement would be three hundred and ten credits.

The invention claimed is:

1. A method of gaming in an electronic gaming machine having a credit accepting mechanism configured to accept a physical item associated with a monetary value for establishing a credit balance based on the monetary value, the credit balance being increasable and decreasable based at least on wagering activity, a payout mechanism configured to cause a payout associated with the credit balance, a game controller, a memory storing data indicative of a plurality of symbols, a random number generator, and a display having a plurality of subsets of display positions, the method comprising:

establishing credit balance including receiving the physical item via said credit accepting mechanism;

in response to having established the credit balance via the credit accepting mechanism, decreasing the credit balance, and generating via the game controller a first game outcome for a game of chance by randomly selecting via the random number generator a plurality of symbols from a set of symbols from the memory;

obtaining via the game controller a player skill based result from play of a game of skill having a potential award value, wherein the game of skill is played at the electronic gaming machine;

generating via the game controller a second game outcome by modifying via the game controller the first game outcome based on the player skill based result, wherein said modifying comprises removing via the game controller at least one of the randomly selected plurality of symbols;

evaluating via the game controller based on the second game outcome whether the potential award value has been lost, wherein the potential award value is associated with a predefined combination of the selected plurality of symbols, and wherein a potential award value is lost when at least one symbol making up a predefined combination is removed through said play of said game of skill;

allocating via the game controller the lost potential award value to a prize pool; and in response to evaluating that the potential award value has not been lost, increasing via the game controller the credit balance; and causing via the payout mechanism an initiation of a payout associated with at least a portion of the credit balance.

2. A method as claimed in claim 1 further comprising determining an additional award value payable in addition to any award value that has been won based on the skill based result based on a total prize pool value.

3. A method as claimed in claim 2 wherein the additional award value is a portion of the prize pool.

4. A method as claimed in claim 1 wherein, when all of the potential award value has been lost, the whole potential award value is allocated to the prize pool and no award is payable to the player for the player skill based result.

5. A method as claimed in claim 1 having more than one prize pool.

6. A method as claimed in claim 5 having one prize pool corresponding to each possible winning outcome having an associated potential award value for the game of skill, wherein, when a winning outcome is lost, the award value associated with the lost winning outcome is allocated to the corresponding prize pool and an additional award value is determined for each winning outcome based on a total prize pool value of the prize pool corresponding to the winning outcome.

7. A method as claimed in claim 1 wherein the potential award value is displayed to the player prior to playing the game of skill to provide the skill based result.

8. A method as claimed in claim 1 wherein the potential award value is revealed to the player during play of the game of skill.

9. A method as claimed in claim 1 wherein the potential award value is revealed to the player after playing the game of skill.

10. A method as claimed in claim 1 wherein the game of skill is based on a Tetris game.

11. A gaming system comprising:

a credit accepting mechanism configured to accept a physical item associated with a monetary value for establishing a credit balance, the credit balance being increasable and decreasable based at least on wagering activity;

a memory storing data indicative of a plurality of symbols;

a random number generator;

a player interface configured to receive game play instructions from a player and including a display for displaying a game in response to said credit balance having been established;

a game of chance controller, in response to having established the credit balance via the credit accepting mechanism receiving the physical item, configured to decrease the credit balance, and to execute play of a game of chance to generate a first game outcome by randomly selecting via the random number generator a plurality of symbols from the memory;

a game of skill controller configured to execute play of a game of skill, having a potential award value, in response to player instructions to produce a player skill based result;

a game outcome modifier configured to generate a second game outcome by modifying the first game outcome based on the player skill based result, wherein said modifying comprises removing at least one of the randomly selected plurality of symbols;

an outcome evaluator configured to use the second game outcome to evaluate whether any potential award value for the skill based game has been lost, wherein the potential award value is associated with a predefined combination of the selected plurality of symbols, and wherein a potential award value is lost when at least one symbol making up a predefined combination is removed through said play of said game of skill;

a prize manager configured to allocate the lost potential award value to a prize pool, and, in response to evaluating that the potential award value has not been lost, increase the credit balance;

a payout mechanism configured to cause an initiation of a payout associated with at least a portion of the credit balance; and a display controller configured to control display of the execution and result of the game of skill.

12. A system as claimed in claim 11 wherein the prize manager is further configured to determine an additional award value payable in addition to any award value that has been won based on the skill based result and based on a total prize pool value.

13. A system as claimed in claim 12 wherein the additional award value is a portion of the prize pool.

14. A system as claimed in claim 11 wherein when all of the potential award value has been lost, the prize manager is further configured to allocate the whole potential award value to the prize pool and pay no award to the player for the player skill based result.

15. A system as claimed in claim 14 having one prize pool corresponding to each possible winning outcome having an associated potential award value for the game of skill, wherein, when a winning outcome is lost, the award value associated with the lost winning outcome is allocated to the corresponding prize pool, and an additional award value is determined for each winning outcome based on a total prize pool value of the prize pool corresponding to the winning outcome.

16. A system as claimed in claim 11 having more than one prize pool.

17. A system as claimed in claim 11 wherein the display controller is further configured to control display of the potential award value.

18. A system as claimed in claim 17 wherein the potential award value is displayed to the player prior to playing the game of skill.

19. A system as claimed in claim 17 wherein the potential award value is displayed to the player during play of the game of skill.

20. A system as claimed in claim 17 wherein the potential award value is displayed to the player after play of the game of skill.

21. A system as claimed in claim 11 wherein the game of skill is based on a Tetris game.

22. A game controller for use with an electronic gaming machine having a credit accepting mechanism configured to accept a physical item associated with a monetary value for establishing a credit balance based on the monetary value, the credit balance being increasable and decreasable based at least on wagering activity, a payout mechanism configured to cause a payout associated with the credit balance, a memory storing data indicative of a plurality of symbols, a random number generator, and a display having a plurality of subsets of display positions, the game controller comprising:

a game of chance controller, in response to having established the credit balance via the credit accepting mechanism receiving the physical item, configured to decrease the credit balance, and to execute play of a game of chance to generate a first game outcome by randomly selecting via the random number generator a plurality of symbols from a set of symbols from the memory in response to said credit balance having been established;

a game of skill controller configured to execute play of a game of skill having a potential award value in response to player instructions to produce a player skill based result;

a game outcome modifier configured to generate a second game outcome by modifying the first game outcome based on the player skill based result, wherein said modifying comprises removing at least one of the randomly selected plurality of symbols;

an outcome evaluator configured to evaluate the second game outcome to determine whether the potential award value has been lost, wherein the potential award value is associated with a predefined combination of the selected plurality of symbols, and wherein a potential award value is lost when at least one symbol making up a predefined combination is removed through said play of said game of skill; and a prize manager configured to allocate the lost award value to a prize pool, and, in response to evaluating that the potential award value has not been lost, increase the credit balance; and wherein the payout mechanism is configured to cause an initiation of a payout associated with at least a portion of the credit balance.

23. A game controller as claimed in claim 22 wherein the prize manager is further configured to determine an additional award value payable in addition to any award value that has been won based on the skill based result based on a total prize pool value.

24. A game controller as claimed in claim 23 wherein the additional award value is a portion of the prize pool.

25. A game controller as claimed in claim 22 wherein, when all of the potential award value has been lost, the prize manager is further configured to allocate the whole potential award value to the prize pool and pay no award to the player for the player skill based result.

26. A game controller as claimed in claim 22 having more than one prize pool.

27. A game controller as claimed in claim 26 having one prize pool corresponding to each possible winning outcome having an associated potential award value for the skill based game, wherein, when a winning outcome is lost the award value associated with the lost winning outcome is allocated to the corresponding prize pool, and an additional award value is determined for each winning outcome based on a prize pool value of the prize pool corresponding to the winning outcome.

28. A game controller as claimed in claim 22 further comprising a display controller configured to control display of the execution and result of the game of skill.

29. A game controller as claimed in claim 28 wherein the display controller is further configured to control display of the potential award value.

30. A game controller as claimed in claim 29 wherein the potential award value is displayed to the player prior to playing the game of skill.

31. A game controller as claimed in claim 29 wherein the potential award value is displayed to the player during play of the game of skill.

32. A game controller as claimed in claim 29 wherein the potential award value is displayed to the player after play of the game of skill.

33. A game controller as claimed in claim 22 wherein the game of skill is based on a Tetris game.

34. A method of gaming at an electronic gaming machine having a credit accepting mechanism configured to accept a physical item associated with a monetary value for establishing a credit balance based on the monetary value, the credit balance being increasable and decreasable based at least on wagering activity, a payout mechanism configured to cause a payout associated with the credit balance, a game controller, a memory storing data indicative of a plurality of symbols, a random number generator, and a display, the method comprising:

establishing credit balance including receiving the physical item via said credit accepting mechanism;

in response to having established the credit balance via the credit accepting mechanism, decreasing the credit balance, and generating via the game controller a first game outcome for a game of chance by randomly selecting via the random number generator a plurality of symbols from a set of symbols from the memory, wherein the plurality of symbols for the first game outcome are displayed at a plurality of positions on the display of the electronic gaming machine;

obtaining via the game controller a player skill based result from play of a game of skill at the electronic gaming machine;

modifying via the game controller based on the skill based result the first game outcome to generate a second game outcome, wherein said modifying comprises removing via the game controller at least one of the randomly selected plurality of symbols from at least one of the plurality of positions on the display;

evaluating via the game controller based on the second game outcome whether the potential award value has been lost, wherein the potential award value is associated with a predefined combination of the selected plurality of symbols, and wherein a potential award value is lost when at least one symbol making up a predefined combination is removed through said play of said game of skill, wherein, when the potential award value is lost, it is allocated a prize pool; and in response to evaluating that the potential award value has not been lost, increasing via the game controller the credit balance; and causing via the payout mechanism an initiation of a payout associated with at least a portion of the credit balance.

35. A method as claimed in claim 34 wherein the game of skill is based on a Tetris game.

36. A method as claimed in claim 35 wherein the selected symbols are selected from a plurality of symbol sets representative of symbols on spinning reels, wherein the symbols are selected for display in the active display positions based on reel stop positions.

37. A gaming system comprising:

a credit accepting mechanism configured to accept a physical item associated with a monetary value for establishing a credit balance, the credit balance being increasable and decreasable based at least on wagering activity;

a memory storing data indicative of a plurality of symbols;

a random number generator;

a player interface configured to receive game play instructions from a player in response to said credit balance having been established, wherein the player interface includes a display for displaying game outcome and prize information to the player;

a game of chance controller configured to execute play of a game of chance to generate a first game outcome by randomly selecting via the random number generator a plurality of symbols from a set of symbols from the memory for display at a plurality of display positions of the display;

a game of skill controller configured to execute play of a game of skill in response to player instructions to produce a player skill based result having a potential award value;

a game modifier configured to generate a second game outcome by modifying the first game outcome based on the player skill based result, wherein said modifying comprises removing at least one of the randomly selected plurality of symbols from at least one of the plurality of display positions of the display; and an outcome evaluator configured to evaluate the second game outcome to determine whether the potential award value has been lost, wherein the potential award value is associated with a predefined combination of the selected plurality of symbols, and wherein a potential award value is lost when at least one symbol making up a predefined combination is removed through said play of said game of skill, and to allocate an award accordingly; and a payout mechanism is configured to cause an initiation of a payout associated with at least a portion of the credit balance.

38. A system as claimed in claim 37 wherein the game of skill is based on a Tetris game.

39. A system as claimed in claim 38 wherein the game of chance controller selects symbols from a plurality of symbol sets representative of symbols on spinning reels, wherein the symbols are selected for display in the active display positions based on reel stop positions.

* * * * *